(12) United States Patent
Yamamoto et al.

(10) Patent No.: US 6,657,326 B1
(45) Date of Patent: Dec. 2, 2003

(54) EFFICIENT CYLINDRICAL LINEAR MOTOR

(75) Inventors: Hideo Yamamoto, Kashiwara (JP); Koyo Shibuya, Nara (JP)

(73) Assignee: Matsushita Refrigeration Company, Osaka (JP)

(*) Notice: Subject to any disclaimer, the term of this patent is extended or adjusted under 35 U.S.C. 154(b) by 38 days.

(21) Appl. No.: 09/869,268
(22) PCT Filed: Oct. 24, 2000
(86) PCT No.: PCT/JP00/07410
§ 371 (c)(1), (2), (4) Date: Jun. 27, 2001
(87) PCT Pub. No.: WO01/31767
PCT Pub. Date: May 3, 2001

(30) Foreign Application Priority Data

Oct. 27, 1999 (JP) .......................................... 11-305063

(51) Int. Cl.[7] .............................................. H02K 41/00
(52) U.S. Cl. ............................................ 310/12; 310/14
(58) Field of Search ....................... 310/12–14; 318/135

(56) References Cited

U.S. PATENT DOCUMENTS

| | | | | |
|---|---|---|---|---|
| 1,779,950 A | * | 10/1930 | Reichel | 310/258 |
| 4,602,174 A | * | 7/1986 | Redlich | 310/15 |
| 5,104,298 A | * | 4/1992 | Takahashi et al. | 417/415 |
| 6,153,951 A | * | 11/2000 | Morita et al. | 310/12 |

FOREIGN PATENT DOCUMENTS

| | | | |
|---|---|---|---|
| JP | 62502442 | | 9/1987 |
| JP | 10-323002 A | * | 12/1998 |
| JP | 11313476 | | 11/1999 |
| JP | 11-313476 A | * | 11/1999 |
| JP | 2000-116100 A | * | 4/2000 |

* cited by examiner

*Primary Examiner*—Nestor Ramirez
*Assistant Examiner*—Judson H. Jones
(74) *Attorney, Agent, or Firm*—Connolly Bove Lodge & Hutz LLP

(57) ABSTRACT

The present invention provides a linear motor, which can improve motor efficiency and which can be manufactured by a simplified procedure. The linear motor of the present invention includes a movable unit of cylindrical shape and having the central axis at the intersection of the X-axis and the Y-axis. An inner yoke is arranged on an inner side of the movable unit with a given spacing in the radial direction of the movable unit and is formed by laminating a multiple of thin plates each in approximately rectangular in shape and having strong magnetic permeability arranged in the direction of the X-axis. An outer yoke is arranged on the outer side of the movable unit with a given spacing in a radial direction of the movable unit and is formed by laminating a multiple of thin plates, each approximately rectangularly shaped and arranged in the same direction as the thin plates of the inner yoke. A pair of permanent magnets are magnetized in a direction from the inner yoke to the outer yoke. The thrust force of the linear motor is stable and motor efficiency is improved.

11 Claims, 13 Drawing Sheets

EFFICIENT CYLINDRICAL LINEAR MOTOR

FIELD OF THE INVENTION

The present invention relates to a movable magnet type linear motor with the purpose of improving motor efficiency and of simplifying the manufacture of the motor.

BACKGROUND OF THE INVENTION

In recent years, fervent efforts have been made on the development of linear motor.

Japanese Patent Application 10-118358 describes a conventional type linear motor.

Description will be given below on the conventional type linear motor as described above referring to the drawings.

FIG. 14 is a cross-sectional plan view of a conventional type linear motor, and FIG. 15 is a cross-sectional view along the line A—A in FIG. 14.

An inner yoke 1 is designed in form of quadratic prism by laminating a multiple of thin plates 2, each of which is in approximately rectangular shape and has high magnetic permeability. An outer yoke 3 is designed in form of quadratic prism by laminating a multiple of thin plates 4, each of which is in approximately rectangular shape and has high magnetic permeability. Slots 6 and 7 are cut out in axial direction 5, and three magnetic poles 8, 9 and 10 are formed. The surface of the outer yoke 3 having the magnetic poles 8, 9 and 10 is directed toward the inner yoke 1 and a yoke block 12 is formed with a given gap 11 between them. A set of yoke blocks is retained on a base 13 so that the inner yokes are arranged at positions opposite to each other with a given spacing.

Coils 14 are wound around the central magnetic pole 9 so that different magnetic poles are alternately formed at three magnetic poles 8, 9 and 10 of outer yoke 3. The coils 14 are independently wound on two outer yokes 3, and the coils 14 are connected in parallel.

A movable unit 15 comprises a pair of planar permanent magnets 16 and 17 magnetized in opposed directions of the inner yoke 1 and the outer yoke 3, a permanent magnet holder 18, and a shaft 19. The permanent magnets 16 and 17 are fixed by a permanent magnet holder 18 with a given spacing in axial direction so that directions of magnetization are opposite to each other, and these magnets are disposed in the gap 11 between the inner yoke 1 and the outer yoke 3.

Description will be given now on operation of the linear motor with the above arrangement.

A magnetic flux generated from the permanent magnet 16 passes through the gap 11, the inner yoke 1, the gap 11, the permanent magnet 17, the outer yoke 3, and the gap 11 and returns to the permanent magnet 16, and a static magnetic field is generated in the gap 11. In the inner yoke 1 and the outer yoke 3, the magnetic flux circulates in the planes of the thin plates 2 and 4.

When AC current is supplied to the coil 14, different magnetic poles are alternately generated in axial direction at the magnetic poles 8, 9, and 10. By magnetically attracting and repelling action of the permanent magnets 16 and 17 of the movable unit 15, thrust force is generated, which is proportional to the magnitude of electric current flowing through the coil 14 and to magnetic flux density of the permanent magnets 16 and 17. Then, the shaft 19 is reciprocally moved together with the movable unit 15 in synchronization with the frequency of AC current.

The conventional arrangement as described above is advantageous in that the inner yoke 1 and the outer yoke 3 can be manufactured in easier manner. However, planar permanent magnets 16 and 17 are arranged in parallel in the gap 11 between the inner yoke 1 and the outer yoke 3 each designed in form of quadratic prism. When the shaft 19 is disposed at axially rotated position during manufacture, balance is lost in the distance between the permanent magnets 16 and 17 and the inner yoke 1 or the distance between the permanent magnets 16 and 17 and the outer yoke 3. This leads to instability of the thrust force of the linear motor.

BRIEF DESCRIPTION OF THE INVENTION

To solve the above problems of the conventional example, it is an object of the present invention to provide a linear motor, in which the thrust force of the linear motor is not turned to unstable even when the shaft 19 is disposed at axially rotated position during manufacture and motor efficiency can be improved and yokes can be manufactured in easier manner.

Also, when the permanent magnets 16 and 17 are disposed at deviated positions closer to the inner yoke 1 or to the outer yoke 3 during manufacture, balance is lost in the distance between the permanent magnets 16 and 17 and the inner yoke 1 or in the distance between the permanent magnets 16 and 17 and the other yoke 3. Thus, the force to directly attract the permanent magnets 16 and 17 toward the inner yoke 1 or the outer yoke 3 is increased. As a result, sliding loss is increased on the bearings 20 via the movable unit 15 and the shaft 19.

It is another object of the present invention to provide a linear motor, in which, even when permanent magnets are disposed at deviated positions closer to the inner yoke or the outer yoke during manufacture, the force to directly attract the permanent magnets toward the inner yoke or the outer yoke is not increased, and the motor efficiency is improved, and the yokes can be manufactured in easier manner.

To solve these problems, the linear motor according to the present invention comprises a movable unit in cylindrical shape and having the central axis at the intersection of X-axis and Y-axis, an inner yoke arranged on inner side of the movable unit with a given spacing in radial direction of the movable unit and being formed by laminating a multiple of thin plates each in approximately rectangular shape and having high magnetic permeability arranged in parallel to one of X-axis or Y-axis, an outer yoke arranged on outer side of the movable unit with a given spacing in radial direction of the movable unit and being formed by laminating a multiple of thin plates each in approximately rectangular shape and having high magnetic permeability arranged in the same direction as the thin plates of the inner yoke, and a pair of permanent magnets magnetized in a direction to connect the inner yoke with the outer yoke and mounted on the movable unit to be retained in a gap between the inner yoke and the outer yoke.

As a result, even when the shaft is disposed at axially rotated position during the manufacture, the thrust force of the linear motor is not turned to unstable. Iron loss of the inner yoke and the outer yoke is reduced. Motor efficiency is improved, and this facilitates the manufacture of the linear motor.

Also, the present invention provides the linear motor as described above, wherein a pair of permanent magnets magnetized in radial direction around the central axis are arranged with a given spacing in parallel to the central axis so that directions of magnetization are opposite to each other, and the magnets being retained in a gap between the inner yoke and the outer yoke.

With such an arrangement, even when the permanent magnets are disposed at deviated positions closer to the inner yoke or the outer yoke, the force to directly attract the permanent magnets toward the inner yoke or the outer yoke is not increased.

Further, the present invention provides the linear motor as described above, wherein the inner yoke is formed by laminating a multiple of thin plates of the same shape and the same dimension, and the outer yoke is formed by laminating a multiple of thin plates of the same shape and the same dimension.

As a result, it is possible to manufacture the linear motor in easier manner.

Also, the present invention provides the linear motor as described above, wherein radius of curvature of inner periphery of the outer yoke is equal to radius of curvature of inner periphery of the slot, and radius of curvature of outer periphery of the outer yoke is equal to radius of curvature of outer periphery of the slot, and radius of curvature of outer periphery of the outer yoke or the slot is greater than the radius of curvature of the inner periphery of the outer yoke or the slot.

As a result, it is possible to design the linear motor in compact size.

Further, the present invention provides the linear motor as described above, wherein outer peripheral end of each of the outermost sides in laminating direction of the thin plates of the inner yoke and an end surface of the permanent magnet are on a line, which connects inner peripheral end of each of the outermost sides in laminating direction of the thin plates of the outer yoke with the intersection of X-axis and Y-axis.

Accordingly, it is possible to reduce the amount of magnets.

Also, the present invention provides the linear motor as described above, wherein two inner yokes are arranged symmetrically with respect to Y-axis, and the two inner yokes are integrated by two inner yoke support members disposed inside the inner yoke and positioned separately in direction of Y-axis.

As a result, the inner yoke can be integrated to a single component, and this facilitates the assembling procedure.

Further, the present invention provides the linear motor as described above, wherein two outer yokes are arranged symmetrically with respect to Y-axis, and the two outer yokes are integrated by two outer yoke support members disposed on each of the outermost sides in laminating direction of the thin plates of the outer yokes.

As a result, the outer yokes can be integrated to a single component, and this facilitates the assembling procedure.

Also, the present invention provides a linear motor, which comprises a movable unit in cylindrical shape having central axis thereof at the intersection of X-axis and Y-axis, an inner yoke arranged on inner side of the movable unit with a given spacing in radial direction of the movable unit and being formed by laminating a multiple of thin plates each in approximately rectangular shape and having high magnetic permeability arranged in parallel to one of X-axis or Y-axis, an outer yoke arranged on outer side of the movable unit with a given spacing in radial direction of the movable unit and being formed by laminating a multiple of thin plates each in approximately rectangular shape and having high magnetic permeability arranged in the same direction as the thin plates of the inner yoke, a base in planar shape for retaining the inner yoke and the outer yoke, a cylinder mounted on the base as to be positioned at the center of X-axis and Y-axis, a piston designed to retain a pair of permanent magnets magnetized in a direction to connect the inner yoke with the outer yoke and retained in a gap between the inner yoke and the outer yoke, provided at forward end of a shaft integrated with the movable unit and placed in the cylinder, and a spring mounted on the shaft.

As a result, even when the permanent magnets are disposed at deviated position closer to the inner yoke or the outer yoke, the force to directly attract the permanent magnets toward the inner yoke or the outer yoke is not increased. Therefore, sliding loss between the piston and the cylinder is also not increased, and this facilitates the manufacture of the linear motor.

Further, the present invention provide a linear motor, which comprises a movable unit in cylindrical shape and having the central axis at the intersection of X-axis and Y-axis, an inner yoke arranged on inner side of the movable unit with a given spacing in radial direction of the movable unit and being formed by laminating a multiple of thin plates each in approximately rectangular shape and having high magnetic permeability arranged in parallel to one of X-axis or Y-axis, an outer yoke arranged on outer side of the movable unit with a given spacing in radial direction of the movable unit, being formed by laminating a multiple of thin plates each in approximately rectangular shape and having high magnetic permeability arranged in the same direction as the thin plates of the inner yoke, and forming a first magnetic pole, a second magnetic pole and a third magnetic pole by arranging two slots cut out in the laminating direction of the thin plates, a coil wound on the second magnetic pole of the outer yoke and forming alternately different magnetic poles at the first magnetic pole, the second magnetic pole and the third magnetic pole, a base in planar shape for retaining the inner yoke and the outer yoke, bearings mounted on the base to be positioned at the center of X-axis and Y-axis, a pair of permanent magnets magnetized in a direction to connect the inner yoke with the outer yoke and mounted on the movable unit to be retained in a gap between the inner yoke and the outer yoke with a given spacing in parallel to the central axis so that directions of magnetization are opposite to each other. Because the movable unit is designed in cylindrical shape, even when the shaft is disposed at axially rotated position during manufacture, thrust force of the linear motor is not turned to unstable. Iron loss in the inner yoke and the outer yoke is reduced, and motor efficiency is improved, and this facilitates the manufacture of the linear motor.

According to another aspect of the present invention, a pair of permanent magnets magnetized in radial direction around the central axis are retained in a gap between the inner yoke and the outer yoke with a given spacing in parallel to the central axis so that directions of magnetization are opposite to each other. Even when the permanent magnets are disposed at deviated positions closer to the inner yoke or the outer yoke during manufacture, the force to directly attract the permanent magnets toward the inner yoke or the outer yoke is not increased, and sliding loss on the sliding portions can be reduced.

According to still another aspect of the present invention, the inner yoke is formed by thin plates of the same shape and the same dimension, and the outer yoke is formed by thin plates of the same shape and the same dimension. Because the inner yoke and the outer yoke can be easily manufactured, this facilitates the manufacture of the linear motor.

According to still another aspect of the present invention, radius of curvature of inner periphery of the outer yoke is equal to radius of curvature of inner periphery of the slot, and radius of curvature of outer periphery of the outer yoke is equal to radius of curvature of outer periphery of the slot. Radius of curvature of outer periphery of the outer yoke or the slot is greater than the radius of curvature of inner periphery of the outer yoke or the slot. This makes it possible to design the linear motor in compact size.

According to still another aspect of the present invention, it is designed in such manner that outer periphery of each of the outermost sides in laminating direction of the thin plates of the inner yoke and an end surface of the permanent magnets are on a line, which connects inner periphery of each of the outermost sides in laminating direction of the thin plates of the outer yoke with the intersection of X-axis and Y-axis. As a result, the amount of magnets can be reduced.

According to still another aspect of the present invention, two inner yokes are disposed symmetrically with respect to Y-axis, and the two inner yokes are integrated by two inner yoke support members provided inside the two inner yokes and positioned separately in direction of Y-axis. As a result, the two inner yokes can be integrated to a single component, and this facilitates the assembling procedure.

According to still another aspect of the present invention, two outer yokes are disposed symmetrically with respect to Y-axis, and the two outer yokes are integrated by two outer yoke support members arranged at each of the outermost sides in laminating direction of the thin plates of the two outer yokes. As a result, the two outer yokes are integrated to a single component, and this facilitates the assembling of the linear motor.

According to still another aspect of the present invention, the linear motor comprises a movable unit of cylindrical shape having central axis thereof at the intersection of X-axis and Y-axis, an inner yoke arranged on inner side of the movable unit with a given spacing in radial direction of the movable unit and being formed by laminating a multiple of thin plates each in approximately rectangular shape and having high magnetic permeability in parallel to one of X-axis or Y-axis, an outer yoke arranged on outer side of the movable unit with a given spacing in radial direction of the movable unit and being formed by laminating a multiple of thin plates each in approximately rectangular shape and having high magnetic permeability in the same direction as the thin plates of the inner yoke, a base in planar shape for retaining the inner yoke and the outer yoke, a cylinder mounted on the base as to be positioned at the center of X-axis and Y-axis, a pair of permanent magnets magnetized in a direction to connect the inner yoke with the outer yoke and arranged on the movable unit to be retained in a gap between the inner yoke and the outer yoke with a given spacing in parallel to the central axis so that directions of magnetization are opposite to each other, a piston disposed at forward end of a shaft integrated with the movable unit and placed in the cylinder, and a spring mounted on the shaft. Even when the permanent magnets are disposed at deviated position closer to the inner yoke or the outer yoke, the force to directly attract the permanent magnets toward the inner yoke or the outer yoke is not increased. Therefore, sliding loss between the piston and the cylinder is not increased, and this facilitates the manufacture of the linear motor.

BEST MODE FOR CARRYING OUT THE INVENTION

Figure 1:
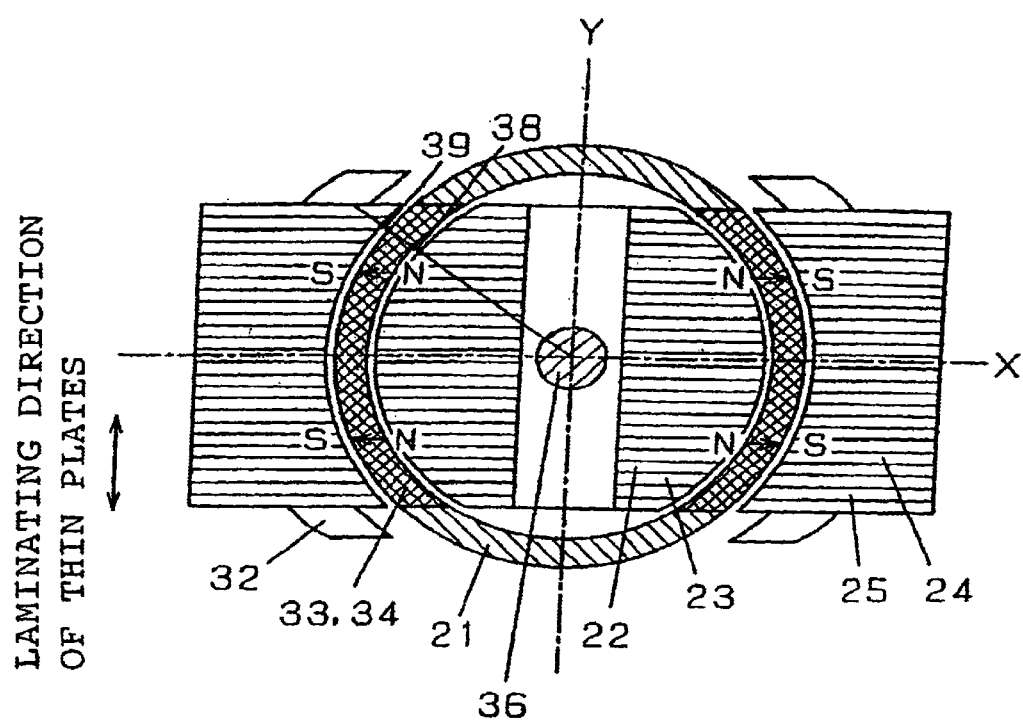
FIG. 1 is a cross-sectional plan view of a linear motor of a first embodiment of the present invention.

Description will be given below on embodiments of a linear motor of the present invention referring to the drawings.

EXAMPLE 1

Figure 2:
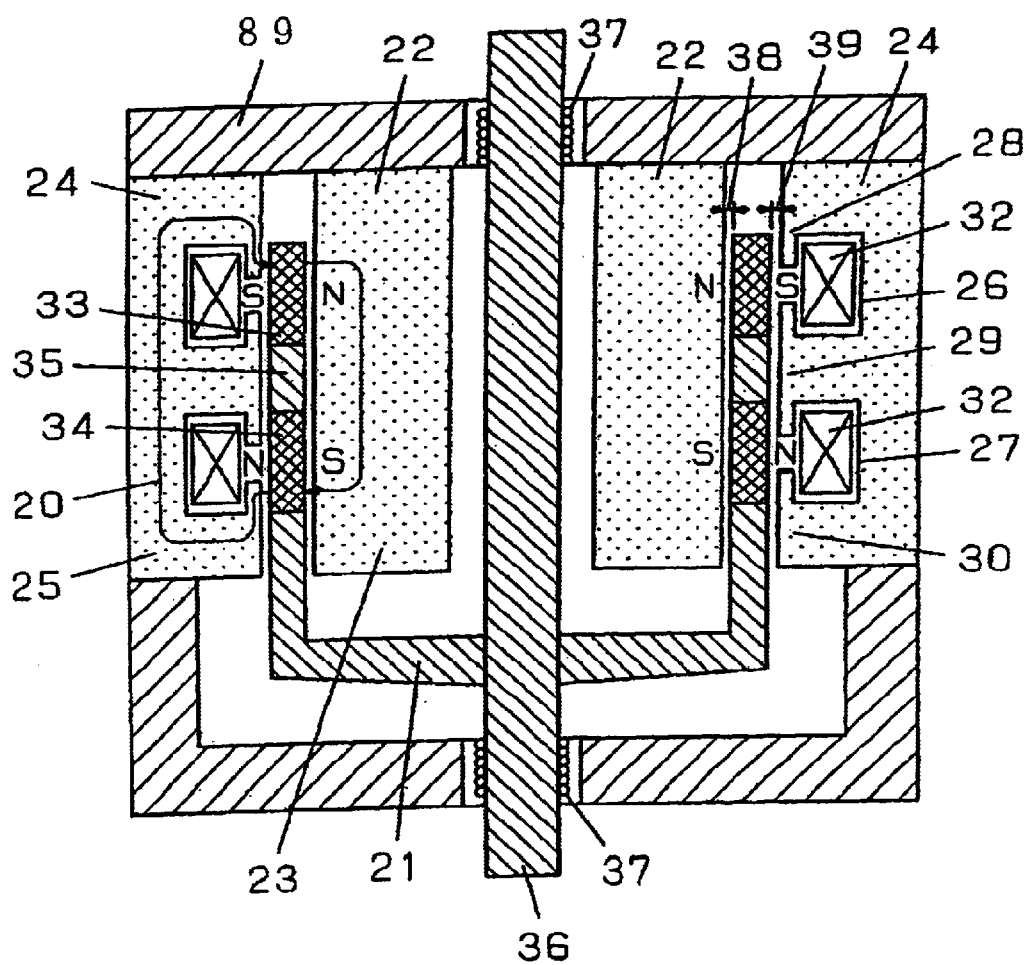
FIG. 2 is a cross-sectional view along X-axis in FIG. 1.

FIG. 1 is a cross-sectional plan view of a first embodiment of a linear motor of the present invention, and FIG. 2 is a cross-sectional view along X-axis in FIG. 1.

A movable unit 21 has its central axis at an intersection of X and Y axes. An inner yoke 22 is disposed on inner side of the movable unit 21 with a gap 38 of a predetermined spacing in radial direction of the movable unit 21, and a multiple of thin plates 23 each in approximately rectangular shape and having high magnetic permeability are laminated in axial direction of one of X-axis or Y-axis. An outer yoke is disposed on outer side of the movable unit 21 with a gap 39 of a predetermined spacing in radial direction of the movable unit 21. A multiple of thin plates 25 each in approximately rectangular shape and having high magnetic permeability are laminated one upon another in the same direction as the thin plates 23 of the inner yoke 22 as described above. Two slots 26 and 27 are cut out in laminating direction of the thin plates 25, and a first magnetic pole 28, a second magnetic pole 29, and a third magnetic pole 30 are formed.

A surface of the outer yoke 24 having the magnetic poles 28, 29 and 30 is retained on a planar base 89 at a position opposite to the inner yoke 22 so that a magnetic path 20 is formed along the surfaces of the thin plates 23 and 25.

Coils 32 are wound around the second magnetic pole 29 so that different magnetic poles are provided alternately on the three magnetic poles 28, 29 and 30 of the outer yoke 24. The coils 32 are wound on the two outer yokes 24 individually, and coils 32 are electrically connected in parallel.

Here, magnetic steel trip (35H440; manufactured by Nippon Steel Corporation) is used as the thin plates 23 and 25, which make up the inner yokes 22 and the outer yokes 24 respectively. The surface of each thin plate has highly saturated magnetic flux density and low core loss, and the surface is provided with an insulating film.

The movable unit 21 comprises a pair of a first permanent magnet 33 and a second permanent magnet 34 in C-shaped or cylindrical shape magnetized in a direction connecting the inner yoke 22 with the outer yoke 24, and a permanent magnet holder 35 and a shaft 36. A magnet of rare earth element of Nd—Fe—B type is preferably used as the first permanent magnet 33 and the second permanent magnetic 34. These permanent magnets are fixed by the permanent magnet holder 35 with a given spacing and in parallel to the central axis so that directions of magnetization are opposite to each other, and these are disposed in a gap between the inner yoke 22 and the outer yoke 24.

As bearings 37 used to smoothly move the shaft 36 in reciprocal movement, linear ball bearings, oil-retaining metal bearings, etc. as conventionally used may be selected.

Now, description will be given on operation of a linear motor with the above arrangement.

A magnetic path 20 (shown by solid line) of magnetic fluxes generated from the first permanent magnet 33 and the second permanent magnet 34 encloses the slot 26 or the slot 27. It passes through the first permanent magnet 33, the gap 38, the inner yoke 22, the gap 38, the second permanent magnet 34, the gap 39, the outer yoke 24, and the gap 39 and returns to the first permanent magnet 33 and generates static magnetic fields in the gaps 38 and 39. In the inner yoke 22 and the outer yoke 24, it circulates in the planes of the thin plates 23 and 25.

When AC current is supplied to the coil 32, different magnetic poles are alternately generated in axial direction on the first magnetic pole 28, the second magnetic pole 29, and the third magnetic pole 30. By magnetic attraction and repulsion of the movable unit 21 with respect to the first permanent magnet 33 and the second permanent magnet 34, there occurs an axial thrust force proportional to the magnitude of electric current and to magnetic flux density of the fluxes generated from the first permanent magnet 33 and the second permanent magnet 34. Then, the shaft 36 is moved reciprocally together with the movable unit 21 in synchronization with the frequency of AC current.

In this case, the movable unit 21 is designed in cylindrical shape, and the inner yoke 22 and the outer yoke 24 are disposed on inner side and outer side of the movable unit 21 respectively with a given spacing in radial direction of the movable unit 21 in the gaps 38 and 39. The first permanent magnet 33 and the second permanent magnet 34 are magnetized in the direction from the inner yoke 22 to the outer yoke 24.

Therefore, even when the shaft 36 is disposed at axially rotated position during manufacture, balance is kept well in the distance between the first permanent magnet 33 or the second permanent magnet 34 and the inner yoke, or in the distance between the first permanent magnet 33 or the second permanent magnet 34 and the outer yoke 24 because the movable unit 21 is designed in cylindrical shape. Thus, thrust force of the linear motor is not turned to unstable.

The inner yoke 22 and the outer yoke 24 can be produced by laminating a multiple of the thin plates 23 and 25 each in approximately rectangular shape and having high magnetic permeability, and this contributes to simplification of the manufacture of the linear motor.

The magnetic path 20 of the magnetic fluxes generated from the first permanent magnet 33 and the second permanent magnet 34 circulates in the planes of the thin plates 23 and 25 in the inner yoke 22 and the outer yoke 24. When the magnetic fluxes circulate in the planes of the thin plates 23 and 25, they tend to generate eddy current in a direction to cross the magnetic fluxes. This is electric current which is proportional to square of the magnetic flux density and is also proportional to square of plate thickness of the material of the yoke. Because the inner yoke 22 and the outer yoke 24 are made up with a multiple of thin plates 23 and 25 each having high magnetic permeability and with insulated surface, it is possible to eliminate generation of eddy current almost completely, and to extensively reduce iron loss. As a result, motor efficiency can be improved.

As described above, the linear motor according to the present embodiment comprises a movable unit in cylindrical shape with its central axis at an intersection of X-axis and Y-axis, an inner yoke disposed on inner side of the movable unit with a given spacing in radial direction of the movable unit and a multiple of thin plates each in approximately rectangular shape and having high magnetic permeability and laminated in parallel to one of X-axis or Y-axis, an outer yoke disposed on outer side of the movable unit with a given spacing in radial direction of the movable unit and being formed by laminating a multiple of thin plates each in approximately rectangular shape and having high magnetic permeability, the thin plates being laminated in the same direction as the direction of the thin plates of the inner yoke, and having a first magnetic pole, a second magnetic pole and a third magnetic pole in two slots which are cut out in laminating direction of the thin plates, a coil wound on the second magnetic pole of the outer yoke and forming alternately different magnetic poles on the first, the second and the third magnetic poles, a base for retaining the inner yoke and the outer yoke, bearings mounted on the base so as to be positioned at the center of the X-axis and Y-axis respectively, and a pair of permanent magnets magnetized in a direction to connect the inner yoke with the outer yoke and provided on the movable unit and retained in a gap between the inner yoke and the outer yoke with a given spacing in parallel to the central axis so that directions of magnetization are opposite to each other. Because the movable unit is designed in cylindrical shape even in case the shaft is arranged at axially rotated position at the time of manufacture, the thrust force of the linear motor is not turned to unstable. Iron loss of the inner yoke and the outer yoke is reduced and motor efficiency is improved, and the procedure to manufacture the linear motor can be simplified.

In the present embodiment, two sets each of the inner yokes and the outer yokes are used, while the same effect can be obtained when three sets or more of these yokes are used.

EXAMPLE 2

Figure 3:
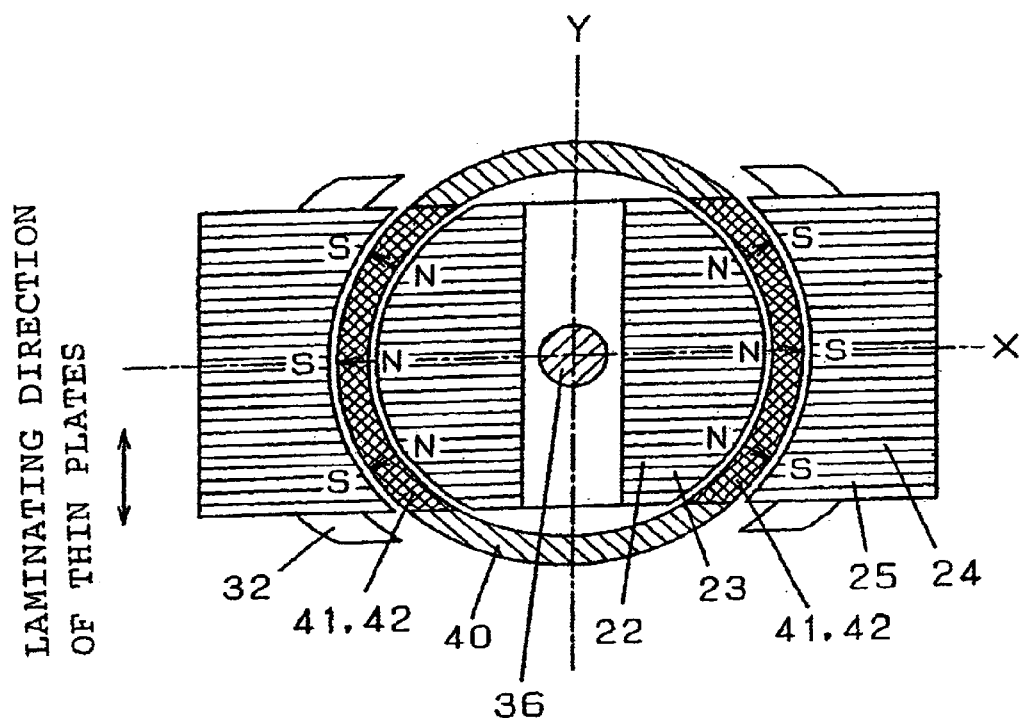
FIG. 3 is a cross-sectional plan view of a linear motor of a second embodiment of the present invention.

FIG. 3 is a cross-sectional plan view of a second embodiment of the linear motor of the present invention. Cross-sectional view along X-axis of the linear motor is the same as FIG. 2 as given above.

According to the present embodiment, in the linear motor of Example 1, there are provided a pair of a first permanent magnet 41 and a second permanent magnet 42 in C-shaped or cylindrical shape and magnetized in radial direction around the central axis. The first permanent magnet 41 and the second permanent magnet 42 are fixed by a permanent magnet holder 35 with a given spacing in axial direction so that directions of magnetization are alternately turned to opposite direction, and these are disposed in a gap between the inner yoke 22 and the outer yoke 24.

TABLE 1

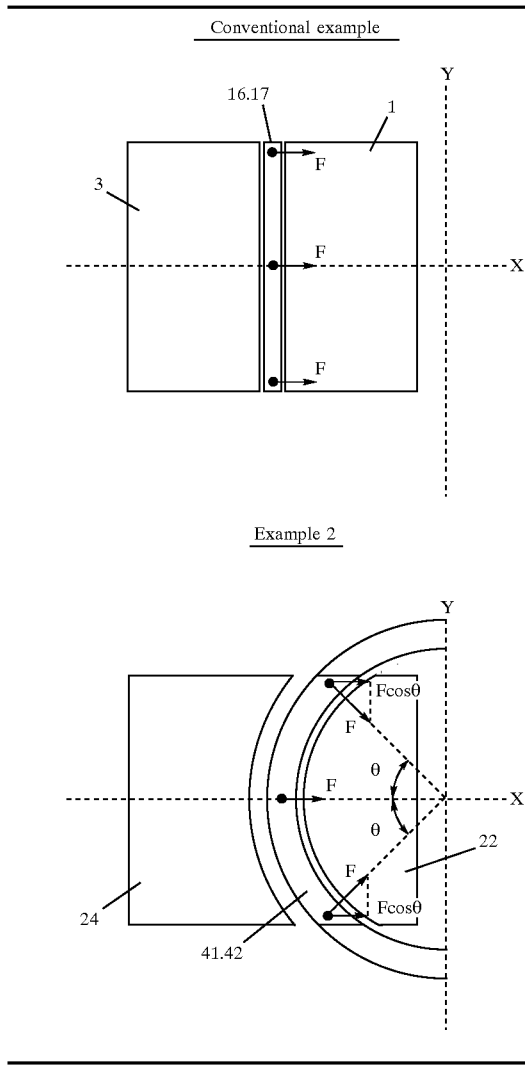

In the conventional arrangement, planar permanent magnets 16 and 17 are disposed in parallel in a gap between an inner yoke 1 and an outer yoke 3 each in form of quadratic prism as shown in Table 1. In case the permanent magnets 16 and 17 are disposed at positions closer to the inner yoke 1 during manufacture, the force to attract the permanent magnets directly toward the inner yoke 1 is increased.

In the linear motor with the above arrangement, in case the first permanent magnet 41 and the second permanent magnet 42 are disposed at positions to closer to the inner yoke 22 or to the outer yoke 24 (deviated in direction of X-axis) as shown in Table 1 during manufacture, the force to directly attract the permanent magnets 41 and 42 toward the inner yoke 22 or the outer yoke 24 is decreased. Specifically, if it is supposed that the force along X-axis is 1, the value of cos θ is decreased as the angle θ is increased. Therefore, compared with the conventional case where the planar magnets 16 and 17 and the inner yoke 1 and the outer yoke 2 each in form of quadratic prism are used, the force to directly attract the permanent magnets 41 and 42 toward the inner yoke 22 or the outer yoke 24 (the force to attract in the direction of X-axis) is decreased, and sliding loss on the bearings 37 can be decreased.

Both the inner yoke 22 and the outer yoke 24 can be formed by laminating many thin plates 23 and 25 each in approximately rectangular shape and having high magnetic permeability, and the linear motor can be produced in easier manner.

As described above, the linear motor according to the present embodiment comprises an inner yoke and an outer yoke arranged at a given spacing in parallel to the central axis, and a pair of permanent magnets magnetized in radial direction around the central axis at the center are retained in a gap between the inner yoke and the outer yoke so that the directions of magnetization are opposite to each other. Even when the permanent magnets are arranged at deviated position closer to the inner yoke or the outer yoke, the force to directly attract the permanent magnets to the inner yoke or the outer yoke is not increased, and sliding loss on the bearings can be reduced.

EXAMPLE 3

Figure 4:
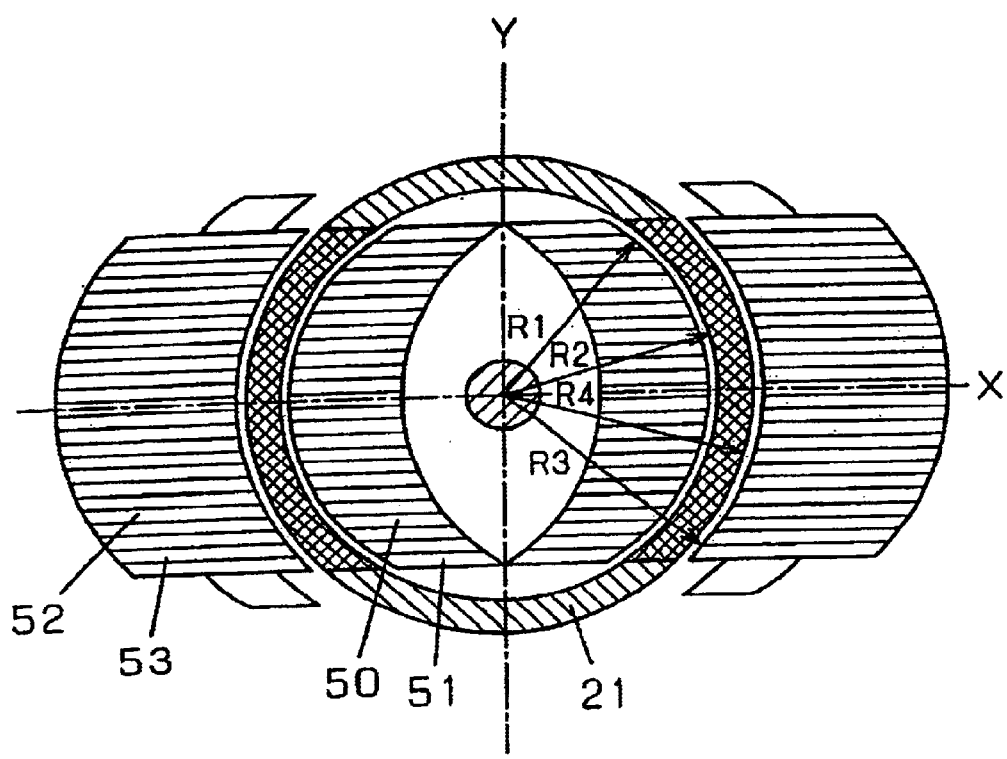
FIG. 4 is a cross-sectional plan view of a linear motor of a third embodiment of the present invention.
Figure 5:
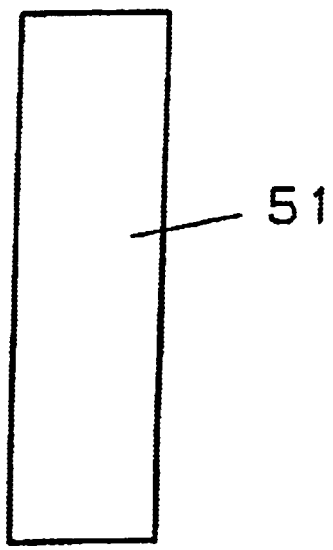
FIG. 5 is a front view of a thin plate to make up an inner yoke in the above embodiment.
Figure 6:
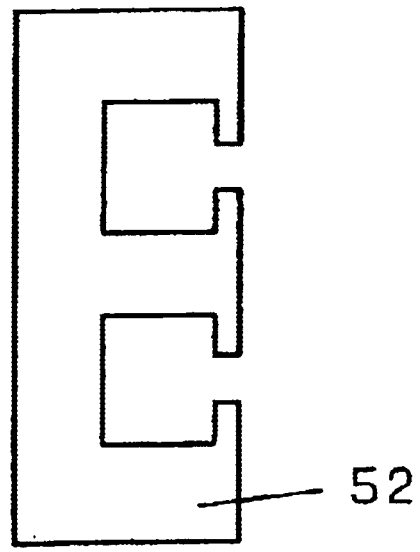
FIG. 6 is a front view of a thin plate to make up an outer yoke in the above embodiment.

FIG. 4 is a cross-sectional plan view of a third embodiment of the linear motor of the present invention. FIG. 5 is a front view of a thin plate of the inner yoke of the present invention, and FIG. 6 is a front view of a thin plate of the outer yoke of the present invention.

According to the present embodiment, in the linear motor as described in Example 1 or 2, thin plates 51 each in approximately rectangular shape and designed in the same shape and in the same dimension and having high magnetic permeability are used to form the inner yoke 50, and a multiple of the thin plates are laminated in parallel to one of X-axis or Y-axis using a jig so that the radius R1 on outer periphery of the inner yoke 50 is smaller by a given value than the radius R2 on inner periphery of the movable unit 21.

Also, thin plates 53 each in approximately rectangular shape and having high magnetic permeability and in the same shape and the same dimension are used as the outer yoke 52, and a multiple of the thin plates 53 are laminated in the same direction as the thin plates 51 of the inner yoke using a jig so that radius R3 on inner periphery of the outer yoke 52 is greater by a given value than radius R4 on outer periphery of the movable unit 21.

In the linear motor with the above arrangement, thin plates of the same shape and the same dimension are laminated to form the inner yoke, and the thin plates of the same shape and the same dimension are laminated to form the outer yoke. Because the inner yoke and the outer yoke can be formed in easier manner, this facilitates the manufacture of the linear motor.

EXAMPLE 4

Figure 7:
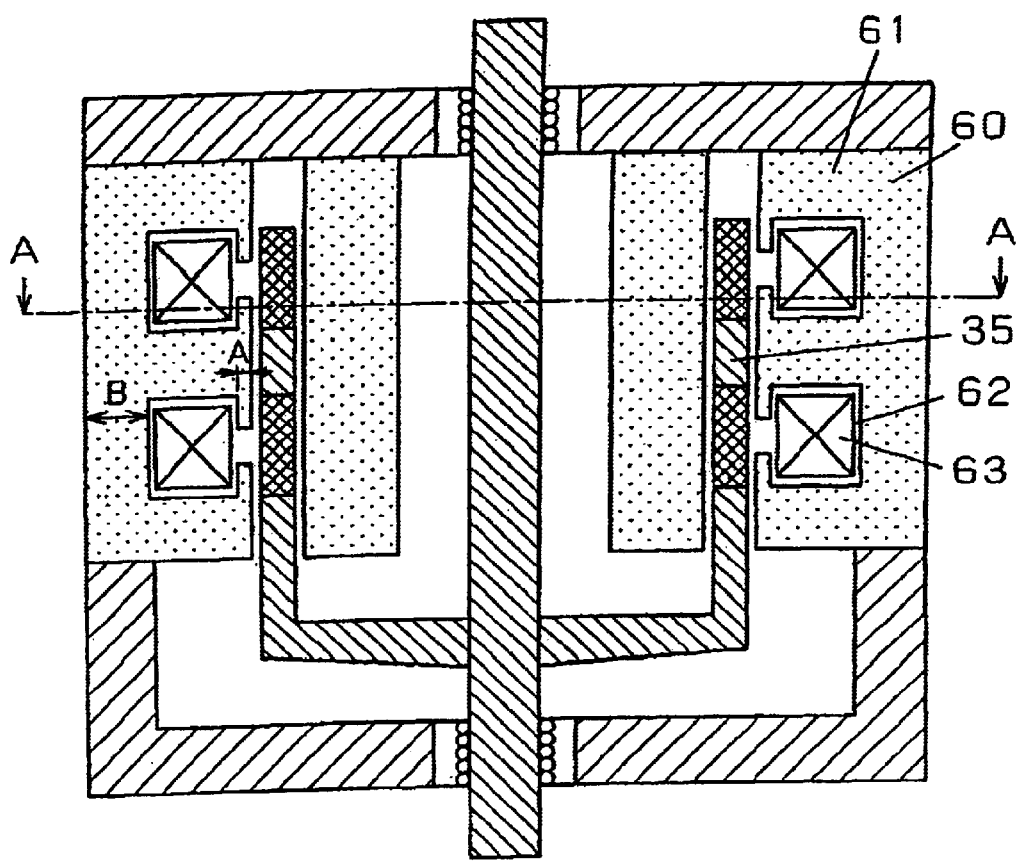
FIG. 7 is a cross-sectional front view of a linear motor of a fourth embodiment of the present invention.
Figure 8:
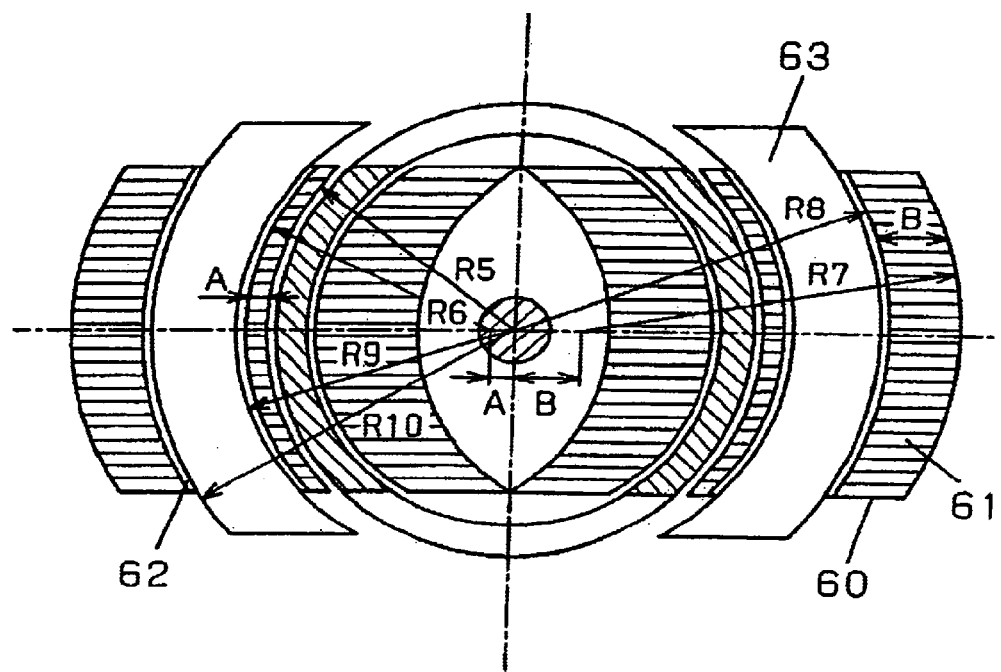
FIG. 8 is a cross-sectional view along the line A—A in FIG. 7.

FIG. 7 is a cross-sectional front view of a fourth embodiment of the linear motor of the present invention. FIG. 8 is a cross-sectional view along the line A—A in FIG. 7.

According to the present embodiment, in the linear motor of Example 1 or 2, thin plates 61 each in approximately rectangular shape and having high magnetic permeability are used for the outer yoke 60. It is designed in such manner that radius of curvature R5 of inner periphery of the outer yoke 60 is equal to radius of curvature R6 of inner periphery of a slot 62, and also that radius of curvature R7 of outer periphery of the outer yoke 60 is equal to radius of curvature R8 of outer periphery of the slot 62. It is designed in such manner that the radius of curvature R7 of outer periphery of the outer yoke and the radius of curvature R8 of outer periphery of the slot 62 are greater than the radius of curvature R5 of inner periphery of the outer yoke 60 and the radius of curvature R6 of inner periphery of the slot 62.

Specifically, on inner periphery of the outer yoke 60, if the center of X-axis and Y-axis is supposed to be the center of the radius of curvature R5, the center of the radius of curvature R6 is at a position deviated from the center of X and Y axes in the direction of X-axis by a dimension A of an opening of the slot 62. Also, on outer periphery of the slot 62, if the center of X and Y axes is supposed to be the center of the radius of curvature R8, outer periphery of the outer yoke 60 has its radius of curvature R7 at a position deviated from the center of X and Y axes in direction of X-axis, deviated by the dimension B on back portion of the outer yoke 60.

In the linear motor with the above arrangement, the radius of curvature R5 on inner periphery of the outer yoke 60 is equal to the radius of curvature R6 of inner periphery of the slot Thus, in any of cross-sections in parallel to X-axis of the outer yoke 60, the dimension A of the opening of the slot 62 is the same. The radius of curvature R7 of outer periphery of the outer yoke 60 is equal to the radius of curvature R8 of outer periphery of the slot 62. Thus, in any of cross-sections in parallel to X-axis, it is equal to the dimension B on back portion of the outer yoke 60. Therefore, in any of the thin plates of the outer yoke 60, the dimension A of the opening of the slot 62 is the same as the dimension B on back portion of the outer yoke 60.

Also, in the shape of the coil 63, a radius R10 of outer periphery of the coil 63 is greater than a radius R9 of inner periphery of the coil 63. The radius of curvature R7 of outer periphery of the outer yoke 60 and the radius of curvature R8 of outer periphery of the slot 62 are designed greater than the radius of curvature R5 of inner periphery of the outer yoke 60 and the radius of curvature R6 of the inner periphery of the slot 62. As a result, the coil 63 is adequately accommodated in the slot 62, and it is possible to design the linear motor in compact size.

As described above, in the linear motor of the present embodiment, the radius of curvature of inner periphery of the outer yoke is equal to the radius of curvature of inner periphery of the slot, and the radius of curvature of outer periphery of the outer yoke is equal to the radius of curvature of outer periphery of the slot. The radius of curvature of outer periphery of the outer yoke or the slot are greater than the radius of curvature of inner periphery of the outer yoke or the slot, and it is possible to design the linear motor in compact size.

EXAMPLE 5

Figure 9:
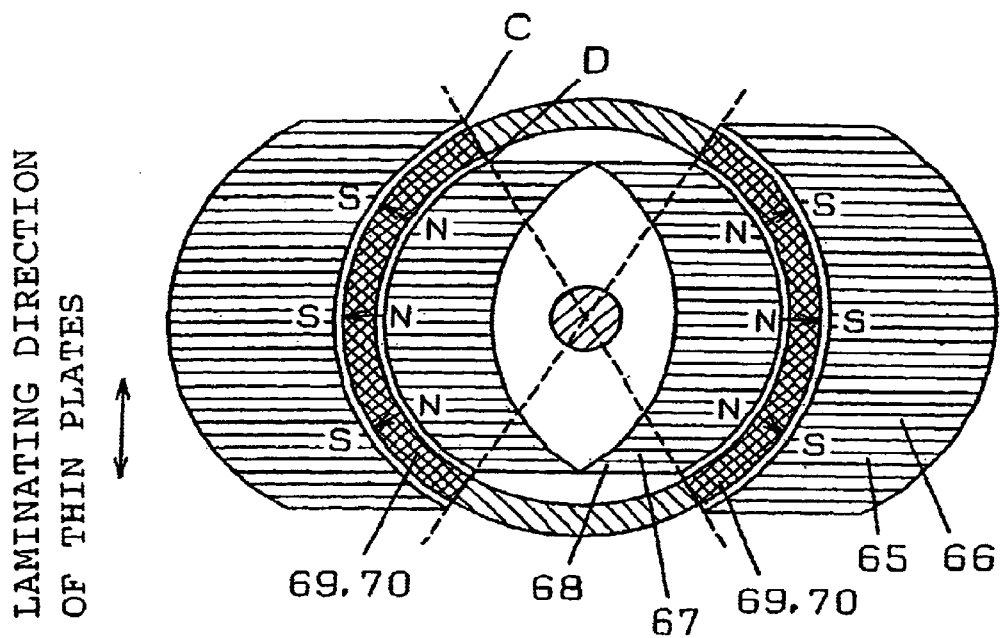
FIG. 9 is a cross-sectional plan view of a linear motor of a fifth embodiment of the present invention.

FIG. 9 is a cross-sectional plan view of a fifth embodiment of the linear motor of the present invention. The cross-sectional front view of the linear motor is the same as in FIG. 2 as given above.

According to this embodiment, in the linear motor of Example 2, it is designed in such manner that outer peripheral end D of each of the outermost sides of the thin plate 68 of the inner yoke 67 in laminating direction and an end surface of the permanent magnet are on a line, which connects an inner peripheral end C (of each of the outermost sides of the thin plate 66 of the outer yoke 65 in laminating direction) with the intersection of X-axis and Y-axis.

A first permanent magnet 69 and a second permanent magnet 70 are magnetized in radial direction toward the central axis, and these magnets are fixed by a permanent magnet holder 35 with a given spacing in axial direction so that the directions of magnetization are alternately directed in opposite direction, and these are arranged in a gap between the inner yoke 67 and the outer yoke 65.

Now, description will be given on operation of the linear motor with the above arrangement.

A magnetic path 31 (shown by N→S) of magnetic fluxes generated from the first permanent magnet 69 and the second permanent magnet 70 encloses the slot 26 or the slot 27. Then, it passes via the first permanent magnet 69, the gap 38, the inner yoke 67, the gap 38, the second permanent magnet 70, the gap 39, the outer yoke 65, and the gap 39 and goes back to the first permanent magnet 69, and static magnetic fields are generated in the gaps 38 and 39. The magnetic path 31 circulates in the planes of the thin plates 66 and 68 in the inner yoke 67 and the outer yoke 65. It circulates in the directions of magnetization of the first permanent magnet 69 and the second permanent magnet 70 respectively in the first permanent magnet 69 and the second permanent magnet 70 and in the gaps, i.e. in radial direction toward the central axis.

Therefore, magnets can be fully utilized without waste, and the amount of magnets can be reduced.

As described above, according to the linear motor of the present embodiment, the outer periphery of each of the outermost sides of the thin plate of the inner yoke in laminating direction and the end surface of the permanent magnet are on a line, which connects the inner periphery of each of the outermost sides in laminating direction of the thin plates of the outer yoke with the intersection of X-axis and Y-axis. This makes it possible to reduce the amount of magnets.

EXAMPLE 6

Figure 10:
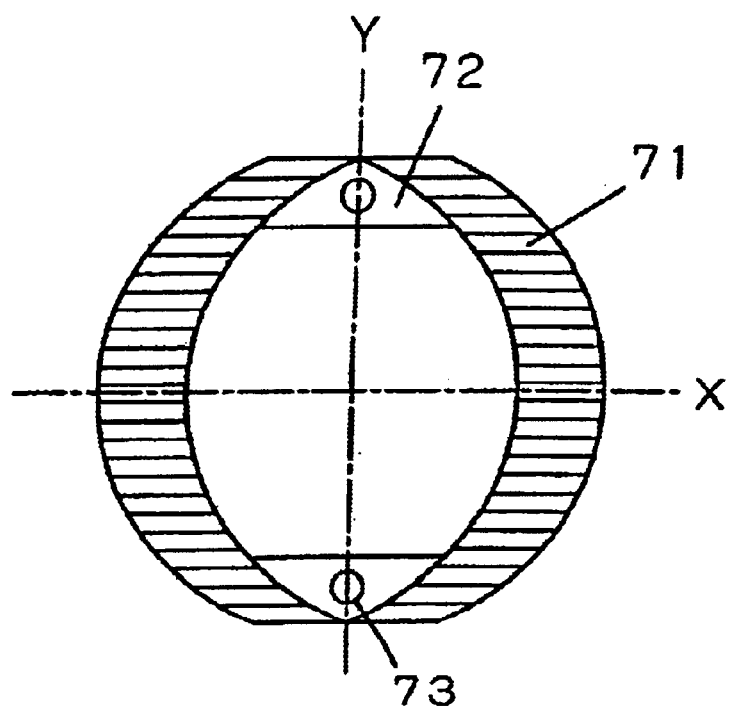
FIG. 10 is a plan view of an inner yoke of a sixth embodiment of the present invention.
Figure 11:
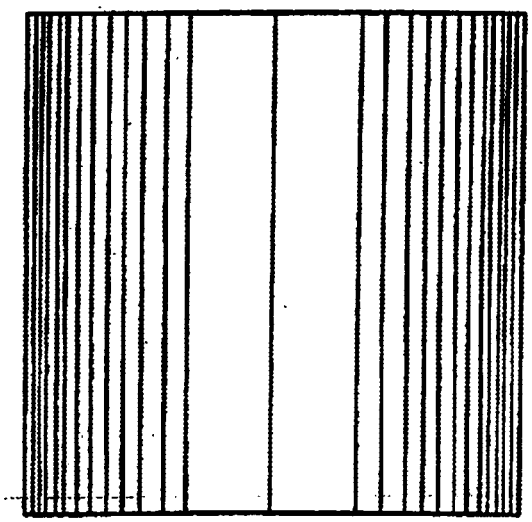
FIG. 11 is a front view of the inner yoke of the above embodiment.

FIG. 10 is a plan view of an inner yoke in a sixth embodiment of the present invention. FIG. 11 is a front view, and overall arrangement as a linear motor is the same as in FIG. 1 and FIG. 2 as given above.

According to the present embodiment, in the linear motor of Example 1 or 2, two inner yokes 71 are arranged symmetrically with respect to Y-axis, and the two inner yokes 71 are integrated by two inner yoke support members 72, which are inside the inner yokes 71 and are positioned separately in direction of Y-axis. Each of the inner yoke support members 72 has a bolt hole 73, and it is used to fix the support member to a base 89.

Therefore, the inner yokes are integrated to a single component, and this facilitates the assembling procedure. Also, the accuracy of assembling with the movable unit 21 can be maintained in easier manner.

As described above, in the linear motor of the present invention, two inner yokes are arranged symmetrically with respect to Y-axis, and the two inner yokes are integrated by two inner yoke support members, which are inside the two inner yokes and are positioned separately in the direction of Y-axis. The inner yokes are integrated in a single component, and this facilitates the assembling procedure.

If the inner yoke support members are made of nonmagnetic stainless steel such as SUS 304, iron loss can be reduced and motor efficiency can be improved.

EXAMPLE 7

Figure 12:
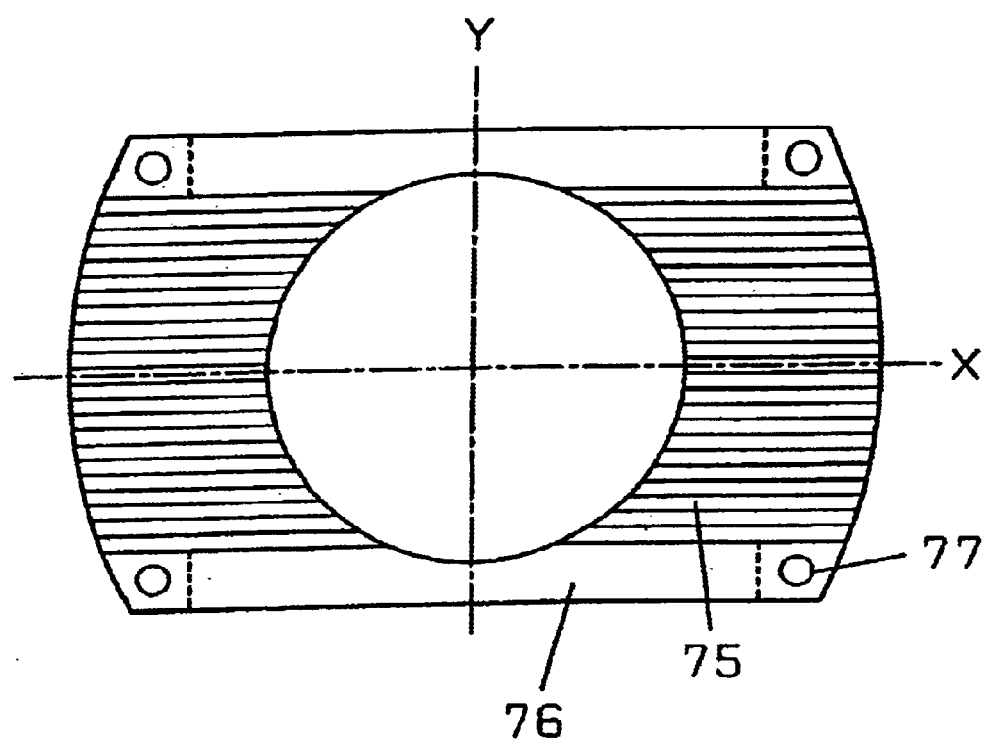
FIG. 12 is a plan view of an outer yoke of a seventh embodiment of the present invention.

FIG. 12 is a plan view of an outer yoke in a seventh embodiment of the present invention. Overall arrangement as a linear motor is the same as in FIG. 1 and FIG. 2 as given above.

According to the present embodiment, in the linear motor of Example 1 or 2, two outer yokes 75 are arranged symmetrically with respect to Y-axis, and the two outer yokes 75 are integrated by two outer yoke support members 76 disposed at each of the outermost positions in laminating direction of the thin plates of the outer yokes. Each of the outer yokes 76 has a hole for bolt 77, and these are used to fix the support members to a base 89.

Therefore, the outer yokes are integrated to a single component, and this facilitates the assembling procedure. Also, the accuracy of assembling with the movable unit 21 can be maintained in easier manner.

As described above, in the linear motor of the present embodiment, two outer yokes are arranged symmetrically with respect to Y-axis, and the two outer yokes are integrated by two outer yoke support members arranged at each of the outermost sides in laminating direction of the thin plates of the two outer yokes. The two outer yokes are integrated to a single component, and this facilitates the assembling procedure.

If the outer yoke support members are made of nonmagnetic stainless steel such as SUS 304, iron loss can be reduced and motor efficiency can be improved.

EXAMPLE 8

Figure 13:
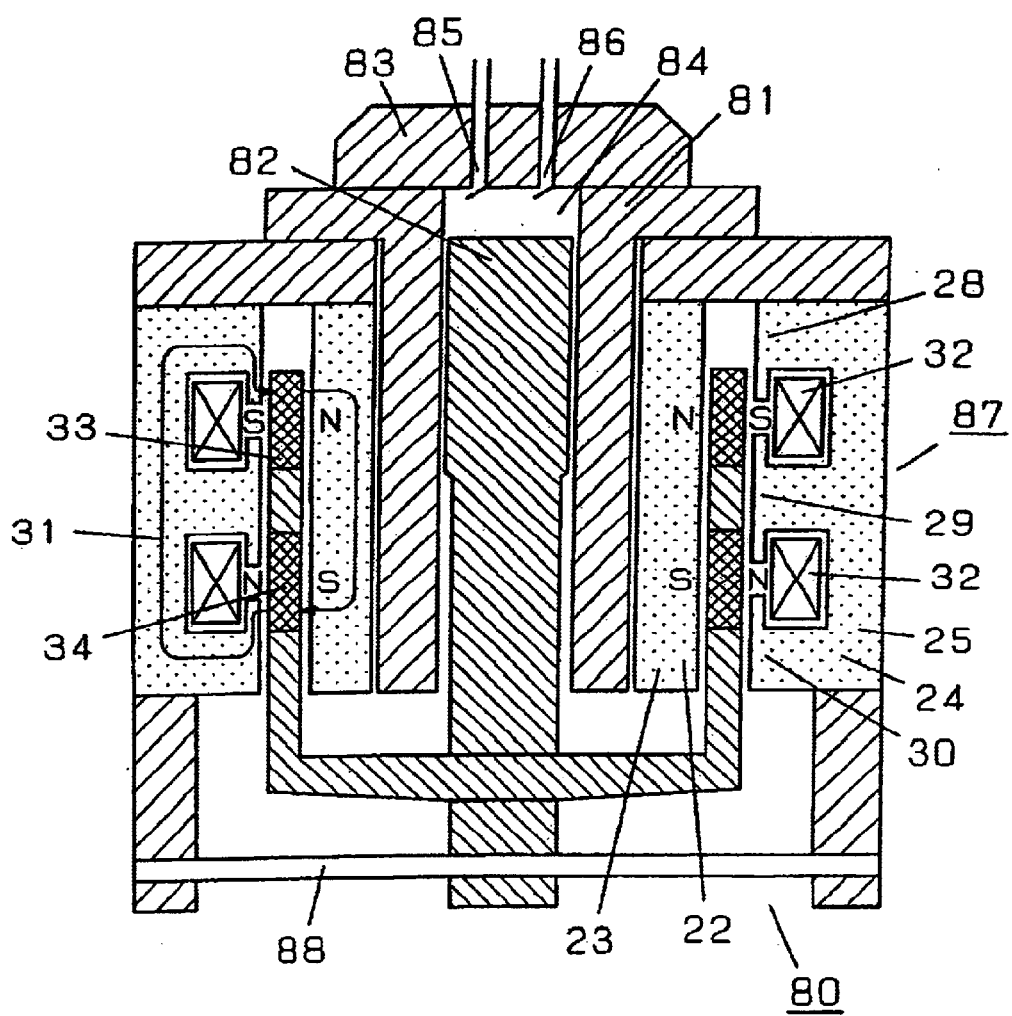
FIG. 13 is a cross-sectional front view of a linear compressor of an eighth embodiment of the present invention.
Figure 14:
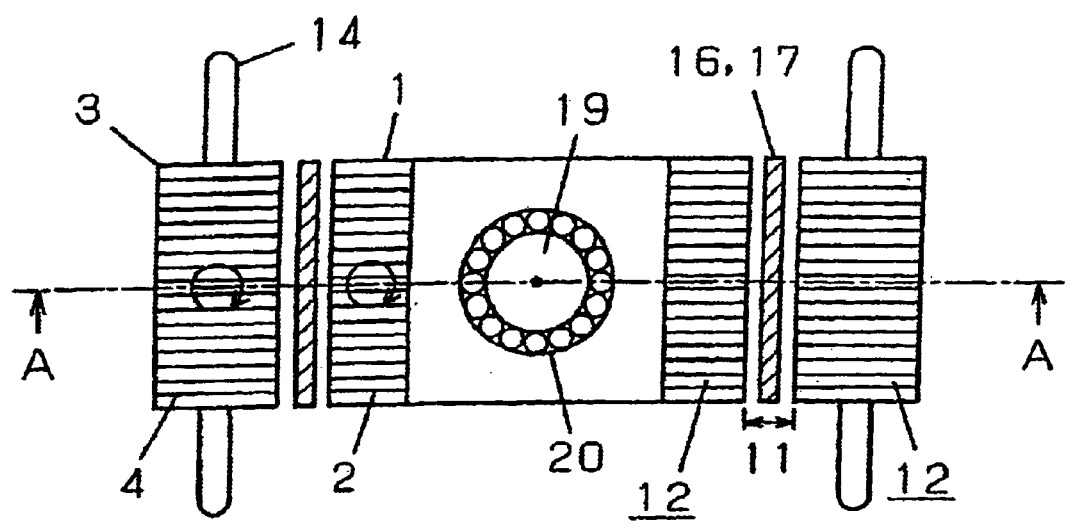
FIG. 14 is a cross-sectional plan view of a conventional type linear motor.
Figure 15:
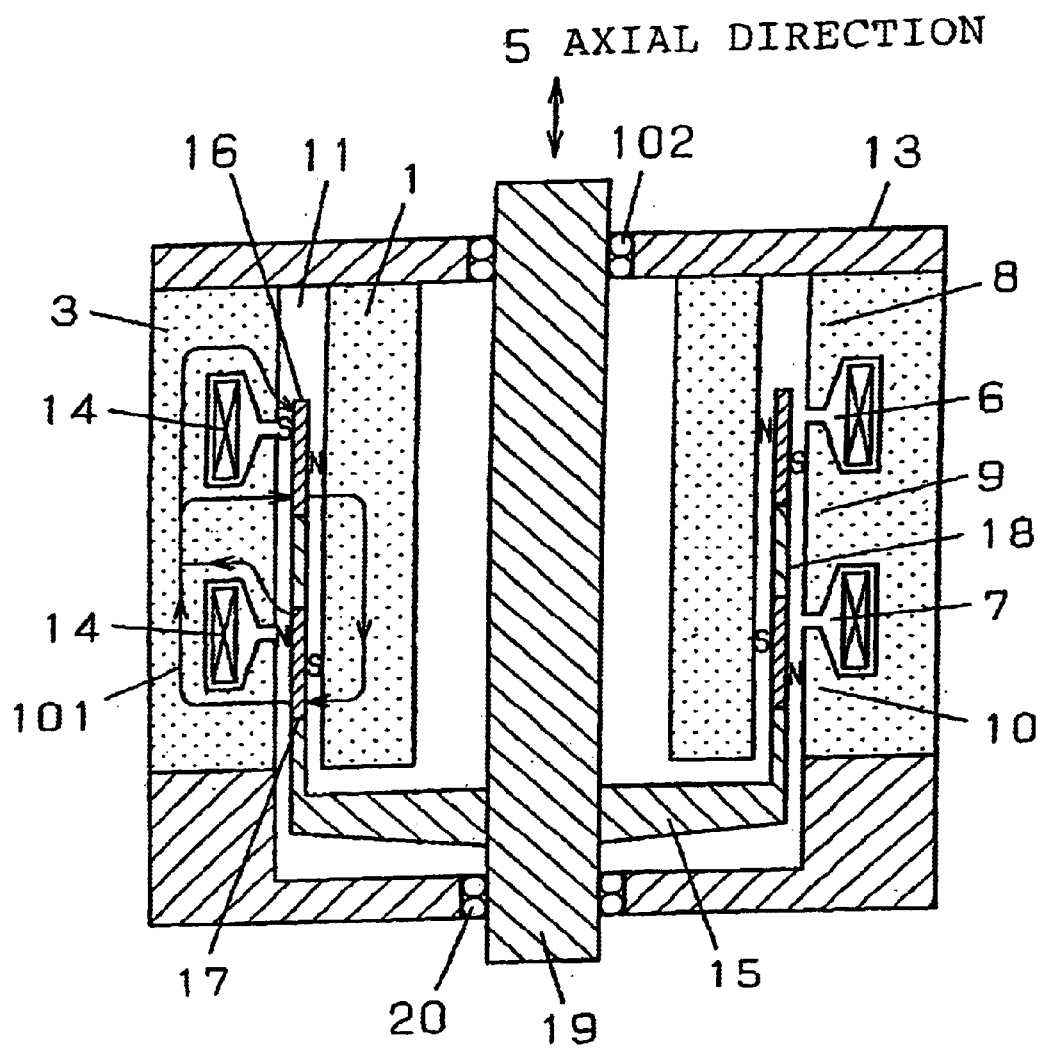
FIG. 15 is a cross-sectional front view of a conventional type linear motor.

FIG. 13 is a cross-sectional front view of an eighth embodiment of a linear compressor according to the present invention.

A linear compressor 80 comprises a cylinder 81, a piston 82 placed in the cylinder 81 so that it can be reciprocally moved, a compression chamber 84 formed as facing to a head 83 of the piston 82, and a suction valve 85 and a discharge valve 86 to be opened or closed in response to gas pressure in the compression chamber 84.

The linear compressor 80 comprises a linear motor 87 for reciprocally moving the piston 82 and a resonant spring 88 for supporting the piston 82 so that it can be moved reciprocally.

The arrangement of the linear motor 87 is the same as the linear motor described in Example 1 and Example 2, and detailed description is not given here.

In the linear compressor 8 with the above arrangement, description will be given now on its operation.

A magnetic flux 31 coming out of an N pole of a first permanent magnet 33 passes through a gap 38, an inner yoke 22, the gap 38, an S pole of a second permanent magnet 34, an N pole of the permanent magnet 34, a gap 39, an outer yoke 24, and the gap 39 and goes back to the S pole of the permanent magnet 33, and static magnetic fields are generated in the gap 38 and the gap 39. In the inner yoke 22 and the outer yoke 24, the magnetic flux circulates in the planes of the thin plates 23 and 25.

When AC current is supplied to the coil 32, different magnetic poles are alternately generated in axial direction on the magnetic poles 28, 29, and 30. By the magnetically attracting and repelling actions of the permanent magnets 33 and 34 and the movable unit 21, thrust force is generated in proportion to the magnitude of electric current flowing through the coil 32 and to the magnetic flux density of the permanent magnets 33 and 34. As a result, the piston 82 is reciprocally moved together with the movable unit 21. When the pressure in the compression chamber 84 is low, expanded gas is sucked into the compression chamber 84 via the suction valve 85. When the pressure in the chamber is high, compressed gas is sucked into the compression chamber 84 via the discharge valve 86, and it works as a linear compressor 80.

The direct-driven type linear motor 87 is integrated with the piston 82, and the piston 82 is reciprocally moved within the cylinder 81 as the movable unit 21 of the linear motor 87 is reciprocally moved. The mechanical sliding loss is generated in the linear compressor 80 only be the piston 82 and the cylinder 81. Therefore, mechanical sliding loss of the linear compressor can be reduced, and compressor efficiency can be increased.

The magnetic flux 31 generated from the permanent magnets 33 and 34 circulates in the planes of the thin plates 23 and 25 in the outer yoke 24. When the magnetic flux 31 circulates in the planes of the thin plates 23 and 25, it generates eddy current in the direction perpendicular to the magnetic flux 31. This is an electric current, which is proportional to square of the magnetic flux density and is also proportional to square of plate pressure of the yoke material. The inner yoke 22 and the outer yoke 24 have high magnetic permeability and have the insulated surfaces and these yokes are formed by laminating a multiple of thin plates 23 and 25. Therefore, it is possible to eliminate generation of eddy current almost completely, and iron loss is extensively reduced. Thus, compressor efficiency can be improved.

Because the inner yoke 22 and the outer yoke 24 are formed by laminating a multiple of thin plates 23 and 25 in simple manner, the linear compressor 80 can be produced in simple manner.

In the above, description has been given on an example where the coil 32 is wound on the outer yoke 24, while the coil 32 may be wound on the inner yoke 22.

In the above, description has been given on an example having 3 magnetic poles, while it is also possible to design in such manner that the inner yoke 22 and the outer yoke 24, the magnets 33 and 34, and the coil 32 are connected in series in axial direction.

As described above, the linear motor of the present embodiment comprises a movable unit of cylindrical shape having the central axis at the intersection of X-axis and Y-axis, an inner yoke arranged on inner side of the movable unit with a given spacing in radial direction of the movable unit and being formed by laminating a multiple of thin plates each in approximately rectangular shape and having high magnetic permeability in axial direction of one of X-axis or Y-axis, an outer yoke arranged on outer side of the movable unit with a given spacing in radial direction of the movable unit and being formed by laminating a multiple of thin plates each in approximately rectangular shape and having high magnetic permeability in the same direction as the thin plates of the inner yoke, a base in planar shape for retaining the inner yoke and the outer yoke, a cylinder mounted so as to be positioned at the center of X-axis and Y-axis, the movable unit being designed in such manner that a pair of C-shaped or cylindrical permanent magnets magnetized from the inner yoke side to the outer yoke side are retained in a gap between the inner yoke and the outer yoke, a piston arranged at forward end of a shaft integrated with the movable unit and placed in the cylinder, and a spring mounted on the shaft Even when the permanent magnets are disposed at deviated positions closer to the inner yoke or the outer yoke at the time of manufacture, the force to directly attract the permanent magnets toward the inner yoke or the outer yoke is not increased. Therefore, sliding loss between the piston and the cylinder is not increased, and the linear motor can be manufactured in easier manner.

INDUSTRIAL APPLICABILITY

As described above, according to an aspect of the present invention, the linear motor of the invention comprises a movable unit in cylindrical shape having the central axis at the intersection of X-axis and Y-axis, an inner yoke arranged on inner side of the movable unit with a given spacing in radial direction of the movable unit and being formed by laminating a multiple of thin plates each in approximately rectangular shape and having high magnetic permeability arranged in axial direction of one of X-axis or Y-axis, an outer yoke arranged on outer side of the movable unit with a given spacing in radial direction of the movable unit and being formed by laminating a multiple of thin plates each in approximately rectangular shape and having high magnetic permeability arranged in the same direction as the thin plates of the inner yoke, and forming a first magnetic pole, a second magnetic pole and a third magnetic pole by arranging two slots being cut out in the laminating direction of the thin plates, a coil wound on the second magnetic pole of the outer yoke and for generating alternately different magnetic poles at the first magnetic pole, the second magnetic pole and the third magnetic pole, a base for retaining the inner yoke and the outer yoke, bearings mounted on the base to be positioned at the center of X-axis and Y-axis and a pair of permanent magnets magnetized in a direction connecting the inner yoke with the outer yoke and mounted on the movable unit, the magnets are retained in a gap between the inner yoke and the outer yoke with a given spacing in parallel to the central axis so that directions of magnetization are opposite to each other. Because the movable unit is designed in cylindrical shape, even when the shaft is arranged at axially rotated position during manufacture, the thrust force of the linear motor is not decreased. Iron loss of the inner yoke and the outer yoke is reduced, and motor efficiency is improved. Also, this facilitates the manufacture of the linear motor.

According to another aspect of the present invention, in addition to the invention described in claim 1, it is designed in such manner that a pair of permanent magnets magnetized in radial direction around the central axis are disposed in a gap between the inner yoke and the outer yoke with a given spacing in parallel to the central axis so that directions of magnetization are opposite to each other. Even when the permanent magnets are disposed at deviated positions to closer to the inner yoke or the outer yoke during manufacture, the force to directly attract the permanent magnets toward the inner yoke or the outer yoke is not increased, and sliding loss on the sliding portions can be decreased.

According to still another aspect of the invention, the inner yoke in the invention described in claim 1 or 2 is formed by thin plates of the same shape and the same dimension, and the outer yoke is formed by thin plates of the same shape and the same dimension. Thus, the inner yoke and the outer yoke can be produced in easier manner, and this facilitates the manufacture of the linear motor.

According to yet still another aspect of the present invention, in the invenbon described in claim 1 or 2, radius of curvature of inner periphery of the outer yoke is equal to radius of curvature of inner periphery of the slot, and radius of curvature of outer periphery of the outer yoke is equal to radius of curvature of outer periphery of the slot. The radius of curvature of outer periphery of the outer yoke or the slot is greater than the radius of curvature of outer periphery of the outer yoke or the slot. This makes it possible to design the linear motor in compact size.

According to yet still another aspect of the present invention, in addition to the invention described in claim 1, it is designed in such manner that outer periphery of each of the two outermost sides in laminating direction of the thin plates of the inner yoke and an end surface of the permanent magnet are on a line, which connects inner periphery of each of the outermost sides in laminating direction of the thin plates of the outer yoke with the intersection of X-axis and Y-axis. As a result, it is possible to reduce the amount of magnets.

According to yet still another aspect of the present invention, in the invention described in claim 1 or 2, two inner yokes are arranged symmetrically with respect to Y-axis, and the two inner yokes are integrated by two inner yoke support members disposed inside the two inner yokes and positioned separately in direction of Y-axis. Thus, the inner yokes are integrated to a single component, and this facilitates the assembling procedure.

According to yet still another aspect of the present invention, in the invention described in claim 1 or 2, two outer yokes are arranged symmetrically with respect to Y-axis, and the two outer yokes are integrated by two outer yoke support members disposed on each of the outermost sides in laminating direction of the thin plates of the two outer yokes. Thus, the two outer yokes are integrated to a single component, and this facilitates the assembling procedure.

According to still another aspect of the present invention, the invention provides a linear motor, which comprises a movable unit in cylindrical shape having its central axis at the intersection of X-axis and Y-axis, an inner yoke arranged on inner side of the movable unit with a given spacing in radial direction of the movable unit and being formed by laminating a multiple of thin plates each in approximately rectangular shape and having high magnetic permeability in the axial direction of one of X-axis or Y-axis, an outer yoke arranged on outer side of the movable unit with a given spacing in radial direction of the movable unit and being formed by laminating a multiple of thin plates each in approximately rectangular shape and having high magnetic permeability in the same direction as the thin plates of the inner yoke, a base in planar shape for retaining the inner yoke and the outer yoke, a cylinder mounted on the base to be positioned at the center of X-axis and Y-axis, a pair of permanent magnets magnetized in a direction connecting the inner yoke with the outer yoke and disposed on the movable unit to be retained in a gap between the inner yoke and the outer yoke with a given spacing in parallel to the central axis so that directions of magnetization are opposite to each other, a piston mounted at forward end of a shaft integrated with the movable unit and placed in the cylinder, and a spring mounted on the shaft. Even when the permanent magnets are at deviated position closer to the inner yoke or the outer yoke during manufacture, the force to directly attract the permanent magnets toward the inner yoke or the outer yoke is not increased. Therefore, sliding loss between the piston and the cylinder is not increased, and this facilitates the manufacture of the linear motor.

What is claimed is:

1. A linear motor, comprising a movable unit in cylindrical shape having its central axis at the intersection of an X-axis and Y-axis, an inner yoke arranged at the inner side of the movable unit with a given spacing in the radial direction of the movable unit between said inner yoke and said movable unit, and being formed by laminating a multiple of thin plates each in approximately rectangular shape and having strong magnetic permeability in parallel to one of the X-axis or Y-axis, an outer yoke arranged at the outer side of the movable unit with a given spacing in a radial direction of the movable unit between said outer yoke and said movable unit, being formed by laminating a multiple of thin plates each in approximately rectangular shape and having strong magnetic permeability arranged in the same direction as the thin plates of the inner yoke, and forming a first magnetic pole, a second magnetic pole, and a third magnetic pole defined by two slots which are cut out in the laminating direction of the thin plates, a coil wound on the second magnetic pole of the outer yoke and for forming alternately different magnetic poles at the first magnetic pole, the second magnetic pole, and the third magnetic pole, a base for retaining the inner yoke and the outer yoke, bearings mounted on the base to be positioned at the center of X-axis and Y-axis, a pair of permanent magnets magnetized in a direction to magnetically couple the inner yoke with the outer yoke and arranged on the movable unit to be retained in a gap between the inner yoke and the outer yoke with a given spacing in parallel to the central axis so that directions of magnetization are opposite to each other, and a shaft integrated with the movable unit and pivotally supported on the bearings, said multiple of thin plates of said inner yoke being of the same shape and the same dimension and said inner yoke being formed such that a radius of an outer surface of said inner yoke with respect to said central axis is smaller than a radius of an inner surface of said movable unit by a predetermined length, and said multiple of thin plates of said outer yoke being of the same shape and the same dimension and said outer yoke being formed such that a radius of an inner surface of said outer yoke with respect to said central axis is greater than a radius of an outer surface of said movable unit by a predetermined length.

2. A linear motor according to claim 1, wherein said pair of permanent magnets are magnetized in the radial direction around the central axis.

3. A linear motor according to claim 1 or 2, wherein a radius of curvature of an inner periphery of the outer yoke is equal to a radius of curvature of an inner periphery of the slot, and a radius of curvature of an outer periphery of the outer yoke is equal to a radius of curvature of an outer periphery of the slot, and the radius of curvature of the outer periphery of the outer yoke or the slot is greater than the radius of curvature of the inner periphery of the outer yoke or the slot.

4. A linear motor according to claim 2, wherein an outer peripheral end of each of the outermost sides in the laminating direction of the thin plates of the inner yoke and an end surface of the permanent magnet are on a line, which connects an inner peripheral end of each of the outermost sides in the laminating direction of the thin plates of the outer yoke with the intersection of the X-axis and the Y-axis.

5. A linear motor according to claim 1 or 2, wherein two of said inner yoke are arranged symmetrically with respect to Y-axis, and two of said inner yoke are integrated by two inner yoke support members disposed inside the inner yokes and positioned separately in a direction of the Y-axis.

6. A linear motor according to claim 5, wherein the inner yoke support members are made of a nonmagnetic material.

7. A linear compressor, comprising a movable unit in cylindrical shape having its central axis at the intersection of an X-axis and Y-axis, an inner yoke arranged at the inner side of the movable unit with a given spacing in the radial direction of the movable unit between said inner yoke and said movable unit, and being formed by laminating a multiple of thin plates each in approximately rectangular shape and having strong magnetic permeability in parallel to one of the X-axis or Y-axis, an outer yoke arranged at the outer side of the movable unit with a given spacing in a radial direction of the movable unit between said outer yoke and said movable unit, being formed by laminating a multiple of thin plates each in approximately rectangular shape and having strong magnetic permeability arranged in the same direction as the thin plates of the inner yoke, and forming a first magnetic pole, a second magnetic pole, and a third magnetic pole defined by two slots which are cut out in the laminating direction of the thin plates, a coil wound on the second magnetic pole of the outer yoke and for forming alternately different magnetic poles at the first magnetic pole, the second magnetic pole, and the third magnetic pole, a base for retaining the inner yoke and the outer yoke, bearings mounted on the base to be positioned at the center of X-axis and Y-axis, a pair of permanent magnets magnetized in a direction to magnetically couple the inner yoke with the outer yoke and arranged on the movable unit to be retained in a gap between the inner yoke and the outer yoke with a given spacing in parallel to the central axis so that directions of magnetization are opposite to each other, and a shaft integrated with the movable unit and pivotally supported on the bearings, said multiple of thin plates of said inner yoke being of the same shape and the same dimension and said inner yoke being formed such that a radius of an outer surface of said inner yoke with respect to said central axis is smaller than a radius of an inner surface of said movable unit by a predetermined length, and said multiple of thin plates of said outer yoke being of the same shape and the same dimension and said outer yoke being formed such that a radius of an inner surface of said outer yoke with respect to said central axis is greater than a radius of an outer surface of said movable unit by a predetermined length, a piston mounted at a forward end of a shaft integrated with the movable unit and placed in the cylinder, and a spring mounted on the shaft.

8. A linear motor, comprising a movable unit in cylindrical shape having its central axis at the intersection of an X-axis and Y-axis, an inner yoke arranged at the inner side of the movable unit with a given spacing in the radial direction of the movable unit between said inner yoke and said movable unit, and being formed by laminating a multiple of thin plates each in approximately rectangular shape and having strong magnetic permeability in parallel to one of the X-axis or Y-axis, an outer yoke arranged at the outer side of the movable unit with a given spacing in a radial direction of the movable unit between said outer yoke and said movable unit, being formed by laminating a multiple of thin plates each in approximately rectangular shape and having strong magnetic permeability arranged in the same direction as the thin plates of the inner yoke, and forming a first magnetic pole, a second magnetic pole, and a third magnetic pole defined by two slots which are cut out in the laminating direction of the thin plates, a coil wound on the second magnetic pole of the outer yoke and for forming alternately different magnetic poles at the first magnetic pole, the second magnetic pole, and the third magnetic pole, a base for retaining the inner yoke and the outer yoke, bearings mounted on the base to be positioned at the center of X-axis and Y-axis, a pair of permanent magnets magnetized in a direction to magnetically couple the inner yoke with the outer yoke and arranged on the movable unit to be retained in a gap between the inner yoke and the outer yoke with a given spacing in parallel to the central axis so that directions of magnetization are opposite to each other, and a shaft integrated with the movable unit and pivotally supported on the bearings, a radius of curvature of an inner periphery of the outer yoke being equal to a radius of curvature of an inner periphery of the slot, and a radius of curvature of an outer periphery of the outer yoke is equal to a radius of curvature of an outer periphery of the slot, and the radius of curvature of the outer periphery of the outer yoke or the slot being greater than the radius of curvature of the inner periphery of the outer yoke or the slot.

9. A linear motor according to claim 8, wherein an outer peripheral end of each of the outermost sides in the laminating direction of the thin plates of the inner yoke and an end surface of the permanent magnet are on a line, which connects an inner peripheral end of each of the outermost sides in the laminating direction of the thin plates of the outer yoke with the intersection of X-axis and Y-axis.

10. A linear motor, comprising a movable unit in cylindrical shape having its central axis at the intersection of an X-axis and Y-axis, an inner yoke arranged at the inner side of the movable unit with a given spacing in the radial direction of the movable unit between said inner yoke and said movable unit, and being formed by laminating a multiple of thin plates each in approximately rectangular shape and having strong magnetic permeability in parallel to one of the X-axis or Y-axis, an outer yoke arranged at the outer side of the movable unit with a given spacing in a radial direction of the movable unit between said outer yoke and said movable unit, being formed by laminating a multiple of thin plates each in approximately rectangular shape and having magnetic permeability arranged in the same direction as the thin plates of the inner yoke, and forming a first magnetic pole, a second magnetic pole, and a third magnetic pole defined by two slots which are cut out in the laminating direction of the thin plates, a coil wound on the second magnetic pole of the outer yoke and for forming alternately different magnetic poles at the first magnetic pole, the second magnetic pole, and the third magnetic pole, a base for retaining the inner yoke and the outer yoke, bearings mounted on the base to be positioned at the center of X-axis and Y-axis, a pair of permanent magnets magnetized in a direction to magnetically couple the inner yoke with the outer yoke and arranged on the movable unit to be retained in a gap between the inner yoke and the outer yoke with a given spacing in parallel to the central axis so that directions of magnetization are opposite to each other, and a shaft integrated with the movable unit and pivotally supported on the bearings, two of said inner yoke being arranged symmetrically with respect to Y-axis, and said two inner yokes are integrated by two inner yoke support members disposed inside the inner yokes and positioned separately in a direction of Y-axis.

11. A linear motor according to claim 10, wherein the inner yoke support members are made of a nonmagnetic material.

* * * * *